(12) United States Patent
Gao et al.

(10) Patent No.: US 11,785,590 B2
(45) Date of Patent: Oct. 10, 2023

(54) MEASURING PRIMARY SYNCHRONIZATION SIGNAL (PSS) SYMBOL TO SPEED UP USER EQUIPMENT (UE) BEAM REFINEMENT

(71) Applicant: QUALCOMM Incorporated, San Diego, CA (US)

(72) Inventors: Kang Gao, San Diego, CA (US); Jun Zhu, San Diego, CA (US); Yong Li, San Diego, CA (US); Yongle Wu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 133 days.

(21) Appl. No.: 17/540,117

(22) Filed: Dec. 1, 2021

(65) Prior Publication Data

US 2023/0171757 A1 Jun. 1, 2023

(51) Int. Cl.
*H04L 12/26* (2006.01)
*H04W 72/044* (2023.01)
*H04W 72/02* (2009.01)
*H04W 24/08* (2009.01)
*H04W 56/00* (2009.01)

(52) U.S. Cl.
CPC ......... *H04W 72/046* (2013.01); *H04W 24/08* (2013.01); *H04W 72/02* (2013.01); *H04W 56/00* (2013.01)

(58) Field of Classification Search
CPC ... H04W 72/046; H04W 24/08; H04W 72/02; H04W 56/00
See application file for complete search history.

(56) References Cited

U.S. PATENT DOCUMENTS

| 2018/0139712 | A1* | 5/2018 | Abedini | ............ H04W 56/0005 |
| 2021/0314931 | A1* | 10/2021 | Farag | .................... H04B 7/0695 |
| 2022/0078728 | A1* | 3/2022 | Yi | .......................... H04W 48/16 |

FOREIGN PATENT DOCUMENTS

| WO | WO-2021067958 A1 * | 4/2021 | ............ H04W 72/02 |
| WO | WO-2021092353 A1 * | 5/2021 | ............. H04L 5/005 |
| WO | WO-2023007723 A1 * | 2/2023 | |
| WO | WO-2023007726 A1 * | 2/2023 | |

* cited by examiner

*Primary Examiner* — Thai D Hoang
(74) *Attorney, Agent, or Firm* — Seyfarth Shaw LLP

(57) ABSTRACT

A method of wireless communication by a user equipment (UE) includes determining a first synchronization signal block (SSB) to monitor beam management. The first SSB comprises a primary synchronization signal (PSS), multiple physical broadcast channels (PBCHs), and a secondary synchronization signal (SSS). The method also includes determining a list of receive beams for measuring the first SSB. The method further includes measuring the first SSB by measuring the PSS with a first beam from the list of receive beams, measuring, with a second beam from the list of receive beams, a first demodulation reference signal (DMRS) on a first PBCH symbol of a first of the PBCHs, measuring the SSS with a third beam from the list of receive beams; and measuring, with a fourth beam from the list of receive beams, a second DMRS on a second PBCH symbol of a second of the PBCHs.

27 Claims, 5 Drawing Sheets

MEASURING PRIMARY SYNCHRONIZATION SIGNAL (PSS) SYMBOL TO SPEED UP USER EQUIPMENT (UE) BEAM REFINEMENT

FIELD OF THE DISCLOSURE

The present disclosure relates generally to wireless communications, and more specifically to using a primary synchronization signal (PSS) symbol in a synchronization signal block (SSB) to improve user equipment (UE) beam refinement during beam management.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method of wireless communication by a user equipment (UE) includes determining a first synchronization signal block (SSB) to monitor for beam management. The first SSB includes a primary synchronization signal (PSS), multiple physical broadcast channels (PBCHs), and a secondary synchronization signal (SSS). The method also includes determining a list of receive beams for measuring the first SSB. The method further includes measuring the first SSB by measuring the PSS with a first beam from the list of receive beams, and by measuring, with a second beam from the list of receive beams, a first demodulation reference signal (DMRS) on a first PBCH symbol of a first of the PBCHs. The method also measures the first SSB by measuring the SSS with a third beam from the list of receive beams, and by measuring, with a fourth beam from the list of receive beams, a second DMRS on a second PBCH symbol of a second of the PBCHs. The first beam, the second beam, the third beam and the fourth beam are each different beams.

Other aspects of the present disclosure are directed to an apparatus for wireless communication by a user equipment (UE), having a memory and one or more processors coupled to the memory. The processor(s) is configured to determine a first synchronization signal block (SSB) to monitor for beam management. The first SSB has a primary synchronization signal (PSS), multiple physical broadcast channels (PBCHs), and a secondary synchronization signal (SSS). The processor(s) is also configured to determine a list of receive beams for measuring the first SSB. The processor(s) is further configured to measure the first SSB by measuring the PSS with a first beam from the list of receive beams, and by measuring, with a second beam from the list of receive beams, a first demodulation reference signal (DMRS) on a first PBCH symbol of a first of the PBCHs. The processor(s) measures the first SSB also by measuring the SSS with a third beam from the list of receive beams and by measuring, with a fourth beam from the list of receive beams, a second DMRS on a second PBCH symbol of a second of the PBCHs. The first beam, the second beam, the third beam and the fourth beam are each different beams.

Other aspects of the present disclosure are directed to an apparatus for wireless communication by a user equipment (UE) including means for determining a first synchronization signal block (SSB) to monitor for beam management. The first SSB has a primary synchronization signal (PSS), multiple physical broadcast channels (PBCHs), and a secondary synchronization signal (SSS). The apparatus also includes means for determining a list of receive beams for measuring the first SSB. The apparatus further includes means for measuring the first SSB, which includes means for measuring the PSS with a first beam from the list of receive beams and means for measuring, with a second beam from the list of receive beams, a first demodulation reference signal (DMRS) on a first PBCH symbol of a first PBCH of the multiple PBCHs. The means for measuring the first SSB also includes means for measuring the SSS with a third beam from the list of receive beams and means for measuring, with a fourth beam from the list of receive beams, a second DMRS on a second PBCH symbol of a second PBCH of the multiple PBCHs. The first beam, the second beam, the third beam and the fourth beam are each different beams.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
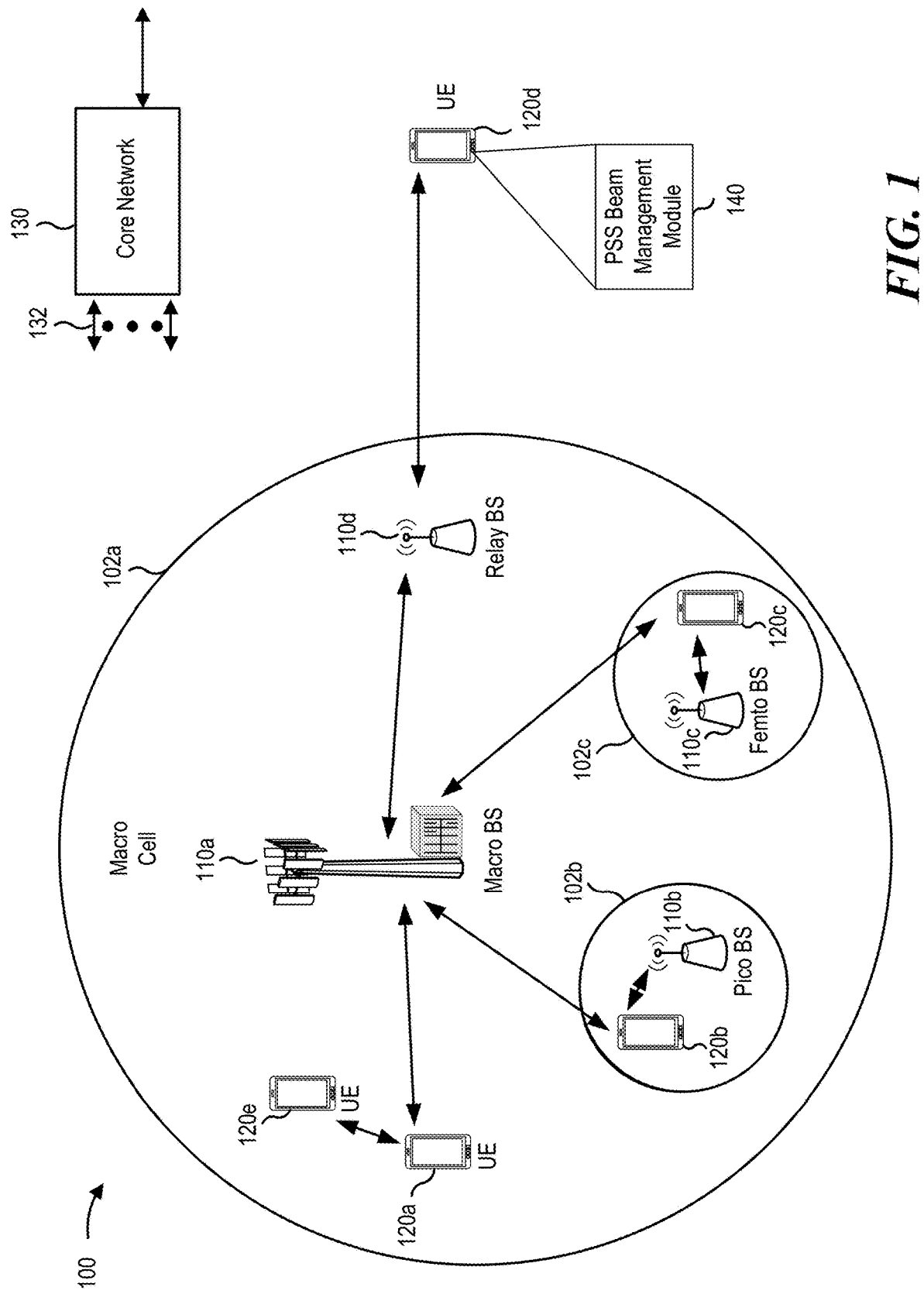
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communication standards (e.g., fifth generation (5G) new radio (NR) standards) may specify a synchronization signal block (SSB) for a user equipment (UE) to measure to enable the UE to access a cell during initial access. The UE may also use the SSB for base station and UE beam tracking, which may occur with a periodicity that is a multiple of twenty ms. Each SSB consists of four time division multiplexed (TDM) symbols transmitted with a same beam. The four symbols are for a primary synchronization signal (PSS), a first physical broadcast channel (PBCH), a secondary synchronization signal (SSS), and a second PBCH. The PBCH may carry a demodulation reference signal (DMRS) and a master information block (MIB). The PSS and SSS are broadcast for radio frame synchronization. The SSS may also be used for a beam scan and a beam report.

A UE may perform a beam scan to determine a best receive beam (also referred to as a receiver beam) by measuring an SSS of a given SSB. To perform the beam scan, the UE uses different UE receive beams to measure different SSBs at different times. Each of these SSBs has the same index. The UE looks for a best signal among the measured beams. The best signal may be associated with a best reference signal received power (RSRP). The receive beam with the best signal may be considered the best receive beam. A UE beam scan based solely on the SSS takes a long time.

An improvement to the SSS beam scan incorporates a demodulation reference signal (DMRS) carried in the two PBCH symbols. By measuring the DMRS with two additional different beams, the beam scan is three times faster than a beam scan measuring only the SSS. According to aspects of the present disclosure, a PSS is also included in the beam scan to further speed up the UE beam scan. The UE beam scan with the PSS can effectively be four times faster than an SSS beam scan by using the PSS together with the DMRSs of the PBCHs.

According to aspects of the present disclosure, a UE determines a particular synchronization signal block index, k, ($SSB_k$) to monitor. The UE also determines a list of UE beams to monitor the $SSB_k$ in order to determine the best UE receive beam for the $SSB_k$. The UE uses different UE receive beams from the list to measure each instance of the PSS. The PSS-based UE beam scan can be used for each SSB that the UE is monitoring, across all numerologies. Example numerologies include those specified for millimeter wave systems, such as 60 kHz, 120 kHz, and 240 kHz.

According to some aspects of the present disclosure, the PSS-based UE beam scan only occurs when an amount of interference from a neighbor cell is below a threshold amount to ensure accurate measurement. If the interference is too high, the feature may be disabled. Detection of a neighbor cell may reduce the effect of interference. In some aspects, PSS-based scanning is only enabled when there is no interference seen from any neighbor cell. In other aspects, to ensure a reliable signal for the PSS, the feature is enabled when the interference from the neighbor cells is small.

Using the PSS together with the DMRSs of the PBCHs for the UE beam scan may speed up beam selection by a factor of four times compared to if only an SSS symbol is used. The PSS-based beam scan may speed up a wide beam scan to access a millimeter wave system. The PSS-based beam scan may also speed up UE beam refinement based on an SSB. The PSS-based beam scan may be particularly beneficial in a millimeter wave system including moving and/or rotating UEs.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B, an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types (e.g., macro BSs, pico BSs, femto BSs, relay BSs, and/or the like). These different types of BSs may have different transmit power levels, different coverage areas, and different impact on interference in the wireless network 100. For example, macro BSs may have a high transmit power level (e.g., 5 to 40 watts) whereas pico BSs, femto BSs, and relay BSs may have lower transmit power levels (e.g., 0.1 to 2 watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a primary synchronization signal (PSS) beam management module 140. For brevity, only one UE 120d is shown as including the PSS beam management module 140. The PSS beam management module 140 may determine a first synchronization signal block (SSB) to monitor for beam management. The first SSB includes a primary synchronization signal (PSS), multiple physical broadcast channels (PBCHs), and a secondary synchronization signal (SSS). The PSS beam management module 140 may also determine a list of receive beams for measuring the first SSB. The PSS beam management module 140 may further measure the first SSB by measuring the PSS with a first beam from the list of receive beams, and by measuring, with a second beam from the list of receive beams, a first demodulation reference signal (DMRS) on a first PBCH symbol of a first of the PBCHs. The PSS beam management module 140 may measure the first SSB by measuring the SSS with a third beam from the list of receive beams, and by measuring, with a fourth beam from the list of receive beams, a second DMRS on a second PBCH symbol of a second of the multiple PBCHs. The first beam, the second beam, the third beam and the fourth beam are each different beams.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
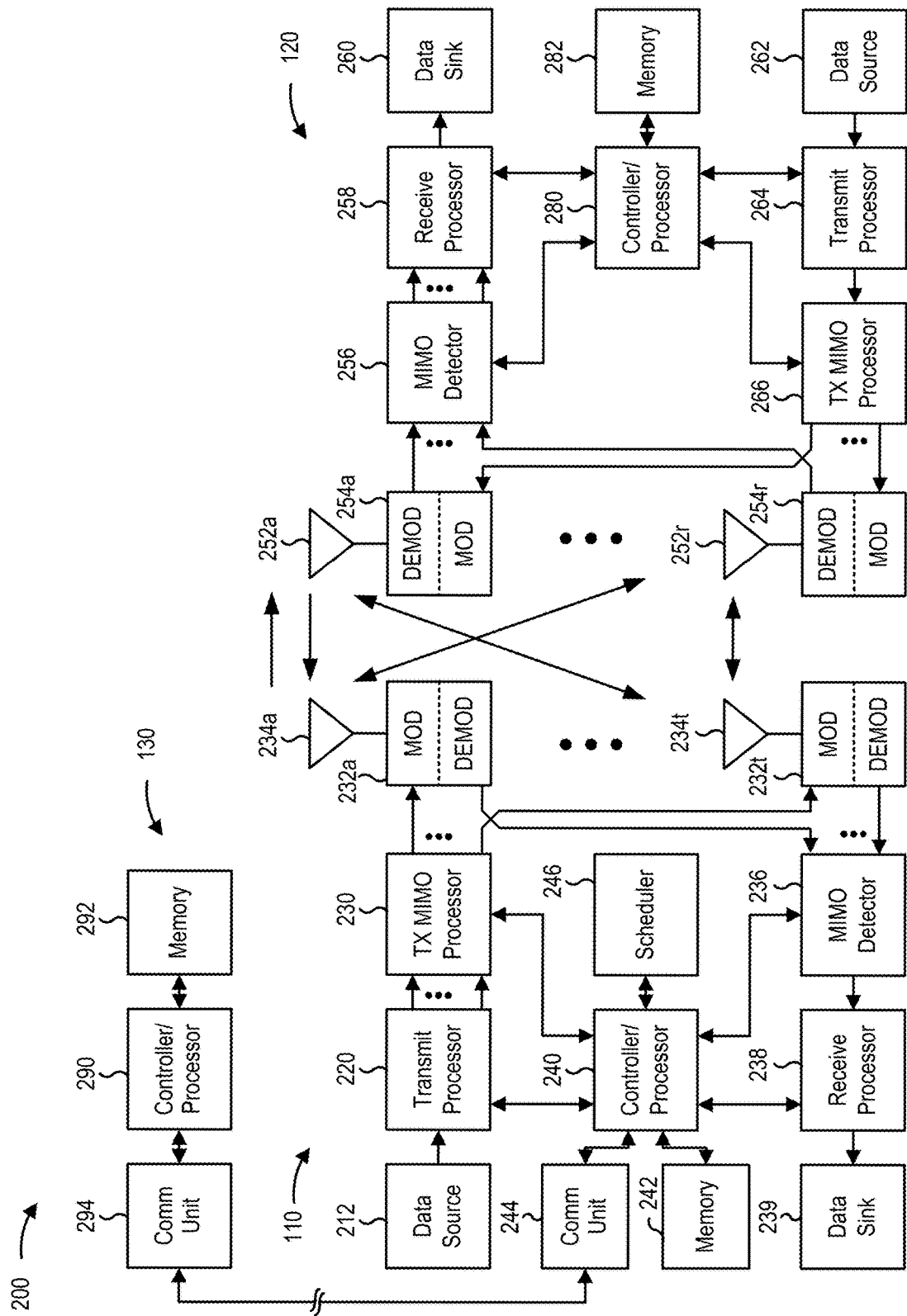
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 280 of the UE 120, and/or any other component(s) of FIG. 2 may perform one or more techniques associated with PSS measurement for beam management, as described in more detail elsewhere. For example, the controller/processor 280 of the UE 120, and/or any other component(s) of FIG. 2 may perform or direct operations of, for example, the process of FIGS. 5 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for determining, means for measuring, and/or means for skipping. Such means may include one or more components of the UE 120 described in connection with FIG. 2.

As indicated above, FIG. 2 is provided merely as an example. Other examples may differ from what is described with regard to FIG. 2.

Wireless communication standards (e.g., fifth generation (5G) new radio (NR) standards) may specify a synchronization signal block (SSB) for a UE to measure to enable the UE to access a cell during initial access. The UE may also use the SSB for base station and UE beam tracking, which may occur with a periodicity that is a multiple of twenty ms. Each SSB consists of four time division multiplexed (TDM) symbols transmitted with a same beam. The four symbols are for a primary synchronization signal (PSS), a first physical broadcast channel (PBCH), a secondary synchronization signal (SSS), and a second PBCH. The PBCH may carry a demodulation reference signal (DMRS) and a master information block (MIB). The PSS and SSS are broadcast for radio frame synchronization. The SSS may also be used for a beam scan and a beam report.

A UE may perform a beam scan to determine a best receive beam (also referred to as a receiver beam) by measuring an SSS of a given SSB. To perform the beam scan, the UE uses different UE receive beams to measure different SSBs at different times. Each of these SSBs has the same index. The UE looks for a best signal among the measured beams. The best signal may be associated with a best reference signal received power (RSRP). The receive beam with the best signal may be considered the best receive beam. A UE beam scan based solely on the SSS takes a long time.

An improvement to the SSS beam scan incorporates a demodulation reference signal (DMRS) carried in the two PBCH symbols. By measuring the DMRS with two additional different beams, the beam scan is three times faster than a beam scan measuring only the SSS. According to aspects of the present disclosure, a PSS is also included in the beam scan to further speed up the UE beam scan. The UE beam scan with the PSS can effectively be four times faster than an SSS beam scan by using the PSS together with the DMRSs of the PBCHs.

According to aspects of the present disclosure, a UE determines a particular synchronization signal block index, k, ($SSB_k$) to monitor. The UE also determines a list of UE beams to monitor the $SSB_k$ in order to determine the best UE receive beam for $SSB_k$. The list of UE beams to monitor may be denoted by RxB[k][n], n=0, 1, . . . , N−1, where n is the UE beam index and N is the number of beams designated for monitoring $SSB_k$. The UE uses different UE receive beams from the list to measure each instance of the PSS.

Figure 3:
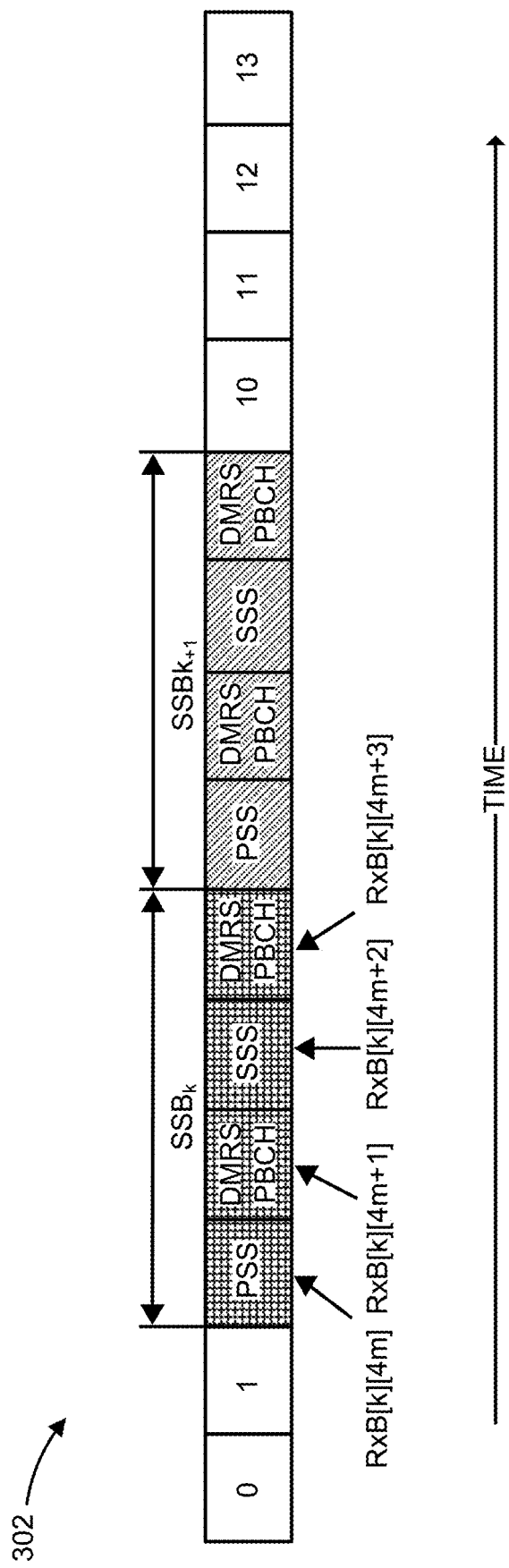
FIG. 3 is a block diagram illustrating a slot with a synchronization signal block (SSB) used for beam management, in accordance with aspects of the present disclosure.

FIG. 3 is a block diagram illustrating a slot with a synchronization signal block (SSB) used for beam management, in accordance with aspects of the present disclosure. A slot 302 with fourteen symbols (symbols 0-13) is shown in the example of FIG. 3, along with two SSBs: $SSB_k$ and $SSB_{k+1}$. The first SSB, $SSB_k$, is located in symbols two though five. The second SSB, $SSB_{k+1}$, is located in symbols six through nine. Each SSB includes a PSS symbol, followed by a first PBCH symbol that carries a DMRS. In the first SSB, $SSB_k$, the PSS is located in symbol two. In the second SSB, $SSB_{k+1}$, the PSS is located in symbol six. Each SSB also includes an SSS symbol followed by a second PBCH symbol carrying another DMRS. In the first SSB, $SSB_k$, the SSS is located in symbol four. In the second SSB, $SSB_{k+1}$, the SSS is located in symbol eight. The PBCH symbols are located in symbols three and five of the first SSB, $SSB_k$, and in symbols seven and nine in the second SSB, $SSB_{k+1}$. An index, m, represents the synchronization signal burst set (SSBS), where each SSBS can have multiple SSBs. The UE can measure four beams when monitoring a particular SSB, e.g., $SSB_k$, of each SSBS.

In the example of FIG. 3, the UE selects the first SSB, $SSB_k$, to monitor. The UE selects a first receive beam RxB[k][4m] from the list of receive beams RxB[k][n] to measure the PSS. The UE selects a second receive beam RxB[k][4m+1] to measure the DMRS in the first PBCH symbol. The UE selects receive beam RxB[k][4m+2] to measure the SSS. The UE selects receive beam RxB[k][4m+3] to measure the DMRS in the second PBCH symbol. For the next occurrences of the first SSB, $SSB_k$, the UE may select additional receive beams from the list of receive beams RxB[k][n] to measure for the PSS, SSS, and PBCH symbols. Once all receive beams from the list of receive beams R×B[k][n] have been measured, the UE selects a receive beam with the best signal (e.g., highest RSRP) as the best receive beam.

Figure 4:
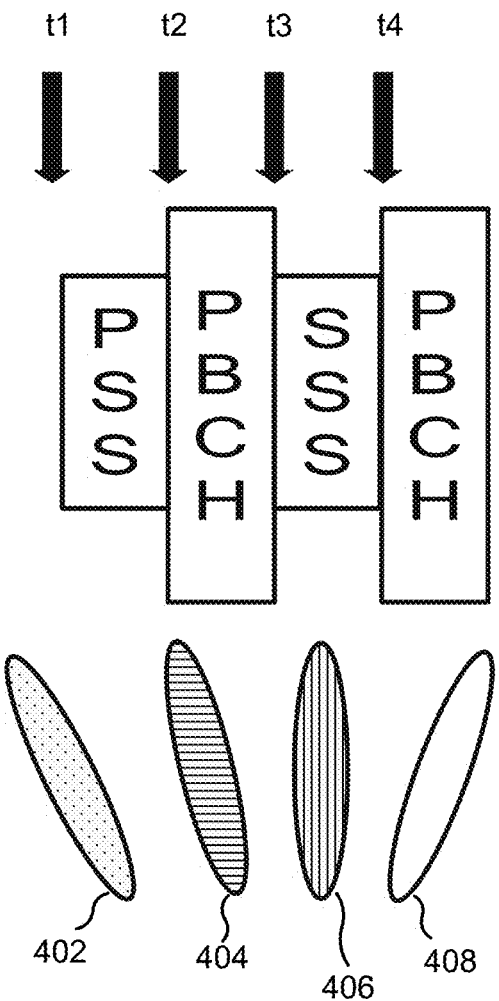
FIG. 4 is a block diagram illustrating beam switching when measuring a synchronization signal block (SSB) for beam management, in accordance with aspects of the present disclosure.

FIG. 4 is a block diagram illustrating beam switching when measuring an SSB for beam management, in accordance with aspects of the present disclosure. In the example of FIG. 4, a first beam switch occurs at time t1. After the first beam switch, a first beam 402 receives the PSS. The UE measures a signal associated with the first beam 402. At time t2, another beam switch occurs. As a result, a signal from a second beam 404 is measured. The second beam 404 receives the DMRS on the first PBCH symbol. At time t3, a third beam switch occurs. After the third beam switch, a third beam 406 is generated to receive the SSS. The UE measures the signal received with the third beam 406. At time t4, a fourth beam switch occurs. As a result, a fourth beam 408 receives the DMRS on the second PBCH symbol. The UE measures a signal received by the fourth beam 408. If additional beams are available in the receive beam list R×B[n], then the UE will measure signals from additional beams at the next SSB with the same index.

The PSS-based UE beam scan can be used for each SSB that the UE is monitoring, across all numerologies. Example numerologies include those specified for millimeter wave systems, such as 60 kHz, 120 kHz, and 240 kHz.

According to some aspects of the present disclosure, the PSS-based UE beam scan only occurs when an amount of interference from a neighbor cell is below a threshold amount to ensure an accurate measurement. If the interference is too high, the feature may be disabled. Detection of a neighbor cell may reduce the effect of interference. In some aspects, PSS-based scanning is only enabled when there is no interference seen from any neighbor cell. In other aspects, to ensure a reliable signal for the PSS, the feature is enabled when the interference from the neighbor cells is small.

For example, this feature may be enabled only when no neighbor cell is detected during a cell search. In other implementations, the feature is only enabled when the measured RSRP or signal to interference plus noise ratio (SINR) at the PSS and SSS are similar. For example, the PSS and SSS strength may be within X dB from each other. The signals may be measured during a cell search, for example, or whenever the transmit beams from the base station are the same for both the PSS and SSS. When both conditions are met, it is an indicator that the interference from the neighbor cell is small, and the PSS-based scan feature can be enabled.

Using the PSS together with the DMRSs of the PBCHs for the UE beam scan may speed up beam selection by a factor of four times compared to if only an SSS symbol is used. The PSS-based beam scan may speed up a wide beam scan to access a millimeter wave system. The PSS-based beam scan may also speed up UE beam refinement based on an SSB. The PSS-based beam scan may be particularly beneficial in a millimeter wave system including moving and/or rotating UEs.

As indicated above, FIGS. 3-4 are provided as examples. Other examples may differ from what is described with respect to FIGS. 3-4.

Figure 5:
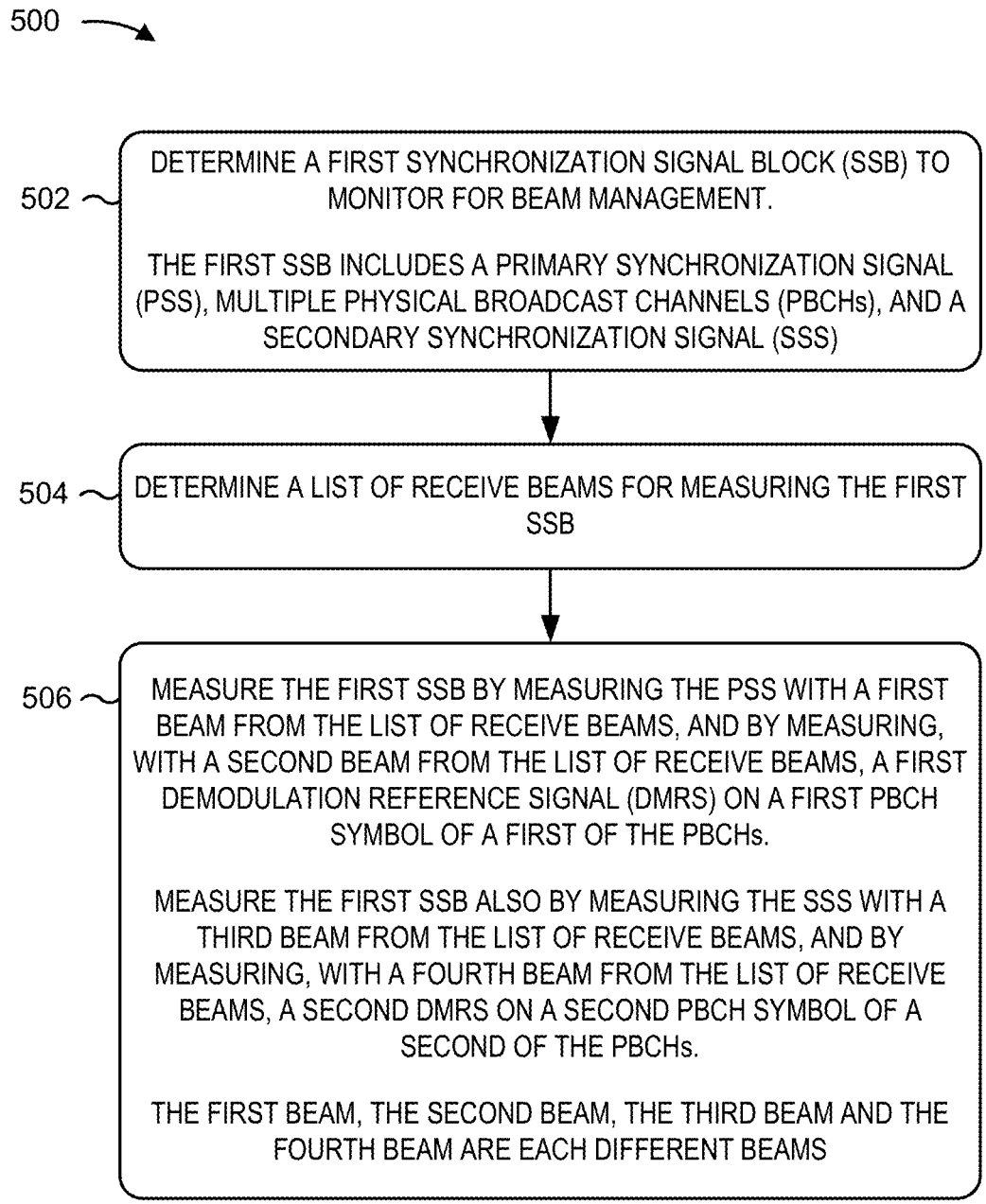
FIG. 5 is a flow diagram illustrating an example process performed, for example, by a user equipment (UE), in accordance with various aspects of the present disclosure.

FIG. 5 is a flow diagram illustrating an example process 500 performed, for example, by a user equipment (UE), in accordance with various aspects of the present disclosure. The example process 500 is an example of using a primary synchronization signal (PSS) symbol in a synchronization signal block (SSB) to improve user equipment (UE) beam refinement during beam management. The operations of the process 500 may be implemented by a UE 120.

At block 502, the user equipment (UE) determines a first synchronization signal block (SSB) to monitor for beam management. The first SSB includes a primary synchronization signal (PSS), multiple physical broadcast channels (PBCHs), and a secondary synchronization signal (SSS). For example, the UE (e.g., using the controller/processor 280 and/or memory 282) may determine the first SSB for example $SSB_k$ as shown in FIG. 3. The first SSB includes a primary synchronization signal (PSS), multiple physical broadcast channels (PBCHs), and a secondary synchronization signal (SSS).

At block 504, the user equipment (UE) determines a list of receive beams for measuring the first SSB. For example, the UE (e.g., using the controller/processor 280 and/or memory 282) may determine the list of receive beams. The UE may determine the list in order to determine the best UE receive beam for the first $SSB_k$, as shown in FIG. 3.

At block 506, the user equipment (UE) measures the first SSB by measuring the PSS with a first beam from the list of receive beams, and by measuring, with a second beam from the list of receive beams, a first demodulation reference signal (DMRS) on a first PBCH symbol of a first of the PBCHs. The method also measures the first SSB by measuring the SSS with a third beam from the list of receive beams, and by measuring, with a fourth beam from the list of receive beams, a second DMRS on a second PBCH symbol of a second of multiple PBCHs. The first beam, the second beam, the third beam and the fourth beam are each different beams. For example, the UE (e.g., using the antenna 252, demodulator 254, MIMO detector 256, receive processor 258, controller/processor 280 and/or memory 282) may measure the first SSB. The measuring of the PSS may occur in response to determining interference from a neighbor cell is less than a first threshold amount Example Aspects Aspect 1: A method of wireless communication by a user equipment (UE), comprising: determining a first synchronization signal block (SSB) to monitor for beam management, the first SSB comprising a primary synchronization signal (PSS), a plurality of physical broadcast channels (PBCHs), and a secondary synchronization signal (SSS); determining a list of receive beams for measuring the first SSB; and measuring the first SSB by: measuring the PSS with a first beam from the list of receive beams; measuring, with a second beam from the list of receive beams, a first demodulation reference signal (DMRS) on a first PBCH symbol of a first PBCH of the plurality of PBCHs; measuring the SSS with a third beam from the list of receive beams; and measuring, with a fourth beam from the list of receive beams, a second DMRS on a second PBCH symbol of a second PBCH of the plurality of PBCHs, in which the first beam, the second beam, the third beam and the fourth beam are each different beams.

Aspect 2: The method of claim 1, further comprising: measuring a second SSB with additional different beams from the list of receive beams, the second SSB having a same SSB index as the first SSB; and determining a best receive beam from the list of receive beams based on the measuring of the first SSB and the measuring of the second SSB.

Aspect 3: The method of Aspect 1 or 2, in which measuring of the PSS occurs in response to determining interference from a neighbor cell is less than a first threshold amount.

Aspect 4: The method of any of the preceding Aspects, in which determining interference from the neighbor cell is less than the first threshold amount comprises determining that the neighbor cell is not detected during a cell search.

Aspect 5: The method of any of Aspects 1-3, in which determining interference from the neighbor cell is less than the first threshold amount comprises determining a measured signal strength of the PSS measured with a fifth beam is within a second threshold amount of a measured signal strength of the SSS measured with the fifth beam.

Aspect 6: The method of any of the preceding Aspects, in which the measured signal strength of the PSS comprises a first reference signal receive power (RSRP) value and the measured signal strength of the SSS comprises a second RSRP value.

Aspect 7: The method of any of Aspects 1-5, in which the measured signal strength of the PSS comprises a first signal to interference plus noise ratio (SINR) value and the measured signal strength of the SSS comprises a second SINR value.

Aspect 8: The method of any of Aspects 1-5, in which determining the measured signal strength of the PSS measured with the fifth beam is within the second threshold amount of the measured signal strength of the SSS measured with the fifth beam occurs during a cell search.

Aspect 9: The method of any of the preceding Aspects, further comprising skipping measuring of the PSS when an amount of interference exceeds a first threshold amount.

Aspect 10: An apparatus for wireless communication by a user equipment (UE), comprising: a memory; and at least one processor coupled to the memory, the at least one processor configured: to determine a first synchronization signal block (SSB) to monitor for beam management, the first SSB comprising a primary synchronization signal (PSS), a plurality of physical broadcast channels (PBCHs), and a secondary synchronization signal (SSS); to determine a list of receive beams for measuring the first SSB; and to measure the first SSB by: measuring the PSS with a first beam from the list of receive beams; measuring, with a second beam from the list of receive beams, a first demodulation reference signal (DMRS) on a first PBCH symbol of a first PBCH of the plurality of PBCHs; measuring the SSS with a third beam from the list of receive beams; and measuring, with a fourth beam from the list of receive beams, a second DMRS on a second PBCH symbol of a second PBCH of the plurality of PBCHs, in which the first beam, the second beam, the third beam and the fourth beam are each different beams.

Aspect 11: The apparatus of Aspect 10, in which the at least one processor is further configured: to measure a second SSB with additional different beams from the list of receive beams, the second SSB having a same SSB index as the first SSB; and to determine a best receive beam from the list of receive beams based on the measuring of the first SSB and the measuring of the second SSB.

Aspect 12: The apparatus of Aspect 10 or 11, in which the at least one processor is further configured to measure the PSS in response to determining interference from a neighbor cell is less than a first threshold amount.

Aspect 13: The apparatus of any of the Aspects 10-12, in which the at least one processor is further configured to determining interference from the neighbor cell is less than the first threshold amount by determining that the neighbor cell is not detected during a cell search.

Aspect 14: The apparatus of any of the Aspects 10-12, in which the at least one processor is further configured to determine interference from the neighbor cell is less than the first threshold amount by determining a measured signal strength of the PSS measured with a fifth beam is within a second threshold amount of a measured signal strength of the SSS measured with the fifth beam.

Aspect 15: The apparatus of any of the Aspects 10-14, in which the measured signal strength of the PSS comprises a first reference signal receive power (RSRP) value and the measured signal strength of the SSS comprises a second RSRP value.

Aspect 16: The apparatus of any of the Aspects 10-14, in which the measured signal strength of the PSS comprises a first signal to interference plus noise ratio (SINR) value and the measured signal strength of the SSS comprises a second SINR value.

Aspect 17: The apparatus of any of the Aspects 10-14, in which the at least one processor is further configured to determine the measured signal strength of the PSS measured with the fifth beam is within the second threshold amount of the measured signal strength of the SSS measured with the fifth beam during a cell search.

Aspect 18: The apparatus of any of the Aspects 10-17, in which the at least one processor is further configured to skip measuring of the PSS when an amount of interference exceeds a first threshold amount.

Aspect 19: An apparatus for wireless communication by a user equipment (UE), comprising: means for determining a first synchronization signal block (SSB) to monitor for beam management, the first SSB comprising a primary synchronization signal (PSS), a plurality of physical broadcast channels (PBCHs), and a secondary synchronization signal (SSS); means for determining a list of receive beams for measuring the first SSB; and means for measuring the first SSB comprising: means for measuring the PSS with a first beam from the list of receive beams; means for measuring, with a second beam from the list of receive beams, a first demodulation reference signal (DMRS) on a first PBCH symbol of a first PBCH of the plurality of PBCHs; means for measuring the SSS with a third beam from the list of receive beams; and means for measuring, with a fourth beam from the list of receive beams, a second DMRS on a second PBCH symbol of a second PBCH of the plurality of PBCHs, in which the first beam, the second beam, the third beam and the fourth beam are each different beams.

Aspect 20: The apparatus of Aspect 19, further comprising: means for measuring a second SSB with additional different beams from the list of receive beams, the second SSB having a same SSB index as the first SSB; and means for determining a best receive beam from the list of receive beams based on the measuring of the first SSB and the measuring of the second SSB.

Aspect 21: The apparatus of Aspect 19 or 20, in which the means for measuring the PSS comprises means for determining interference from a neighbor cell is less than a first threshold amount.

Aspect 22: The apparatus of any of the Aspects 19-21, in which the means determining interference from the neighbor cell is less than the first threshold amount comprises means for determining that the neighbor cell is not detected during a cell search.

Aspect 23: The apparatus of any of the Aspects 19-21, in which the means for determining interference from the neighbor cell is less than the first threshold amount comprises means for determining a measured signal strength of the PSS measured with a fifth beam is within a second threshold amount of a measured signal strength of the SSS measured with the fifth beam.

Aspect 24: The apparatus of any of the Aspects 19-23, in which the measured signal strength of the PSS comprises a first reference signal receive power (RSRP) value and the measured signal strength of the SSS comprises a second RSRP value.

Aspect 25: The apparatus of any of the Aspects 19-23, in which the measured signal strength of the PSS comprises a first signal to interference plus noise ratio (SINR) value and the measured signal strength of the SSS comprises a second SINR value.

Aspect 26: The apparatus of any of the Aspects 19-23, in which the means for determining the measured signal strength of the PSS measured with the fifth beam is within the second threshold amount of the measured signal strength of the SSS measured with the fifth beam operates during a cell search.

Aspect 27: The apparatus of any of the Aspects 19-26, further comprising means for skipping measuring of the PSS when an amount of interference exceeds a first threshold amount.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   determining a first synchronization signal block (SSB) to monitor for beam management, the first SSB comprising a primary synchronization signal (PSS), a plurality of physical broadcast channels (PBCHs), and a secondary synchronization signal (SSS);
   determining a list of receive beams for measuring the first SSB; and
   measuring the first SSB by:
      measuring the PSS with a first beam from the list of receive beams;
      measuring, with a second beam from the list of receive beams, a first demodulation reference signal (DMRS) on a first PBCH symbol of a first PBCH of the plurality of PBCHs;
      measuring the SSS with a third beam from the list of receive beams; and
      measuring, with a fourth beam from the list of receive beams, a second DMRS on a second PBCH symbol of a second PBCH of the plurality of PBCHs, in which the first beam, the second beam, the third beam and the fourth beam are each different beams.

2. The method of claim 1, further comprising:
   measuring a second SSB with additional different beams from the list of receive beams, the second SSB having a same SSB index as the first SSB; and
   determining a best receive beam from the list of receive beams based on the measuring of the first SSB and the measuring of the second SSB.

3. The method of claim 1, in which measuring of the PSS occurs in response to determining interference from a neighbor cell is less than a first threshold amount.

4. The method of claim 3, in which determining interference from the neighbor cell is less than the first threshold amount comprises determining that the neighbor cell is not detected during a cell search.

5. The method of claim 3, in which determining interference from the neighbor cell is less than the first threshold amount comprises determining a measured signal strength of the PSS measured with a fifth beam is within a second threshold amount of a measured signal strength of the SSS measured with the fifth beam.

6. The method of claim 5, in which the measured signal strength of the PSS comprises a first reference signal receive power (RSRP) value and the measured signal strength of the SSS comprises a second RSRP value.

7. The method of claim 5, in which the measured signal strength of the PSS comprises a first signal to interference plus noise ratio (SINR) value and the measured signal strength of the SSS comprises a second SINR value.

8. The method of claim 5, in which determining the measured signal strength of the PSS measured with the fifth beam is within the second threshold amount of the measured signal strength of the SSS measured with the fifth beam occurs during a cell search.

9. The method of claim 1, further comprising skipping measuring of the PSS when an amount of interference exceeds a first threshold amount.

10. An apparatus for wireless communication by a user equipment (UE), comprising:
a memory; and
at least one processor coupled to the memory, the at least one processor configured:
to determine a first synchronization signal block (SSB) to monitor for beam management, the first SSB comprising a primary synchronization signal (PSS), a plurality of physical broadcast channels (PBCHs), and a secondary synchronization signal (SSS);
to determine a list of receive beams for measuring the first SSB; and
to measure the first SSB by:
measuring the PSS with a first beam from the list of receive beams;
measuring, with a second beam from the list of receive beams, a first demodulation reference signal (DMRS) on a first PBCH symbol of a first PBCH of the plurality of PBCHs;
measuring the SSS with a third beam from the list of receive beams; and
measuring, with a fourth beam from the list of receive beams, a second DMRS on a second PBCH symbol of a second PBCH of the plurality of PBCHs, in which the first beam, the second beam, the third beam and the fourth beam are each different beams.

11. The apparatus of claim 10, in which the at least one processor is further configured:
to measure a second SSB with additional different beams from the list of receive beams, the second SSB having a same SSB index as the first SSB; and
to determine a best receive beam from the list of receive beams based on the measuring of the first SSB and the measuring of the second SSB.

12. The apparatus of claim 10, in which the at least one processor is further configured to measure the PSS in response to determining interference from a neighbor cell is less than a first threshold amount.

13. The apparatus of claim 12, in which the at least one processor is further configured to determining interference from the neighbor cell is less than the first threshold amount by determining that the neighbor cell is not detected during a cell search.

14. The apparatus of claim 12, in which the at least one processor is further configured to determine interference from the neighbor cell is less than the first threshold amount by determining a measured signal strength of the PSS measured with a fifth beam is within a second threshold amount of a measured signal strength of the SSS measured with the fifth beam.

15. The apparatus of claim 14, in which the measured signal strength of the PSS comprises a first reference signal receive power (RSRP) value and the measured signal strength of the SSS comprises a second RSRP value.

16. The apparatus of claim 14, in which the measured signal strength of the PSS comprises a first signal to interference plus noise ratio (SINR) value and the measured signal strength of the SSS comprises a second SINR value.

17. The apparatus of claim 14, in which the at least one processor is further configured to determine the measured signal strength of the PSS measured with the fifth beam is within the second threshold amount of the measured signal strength of the SSS measured with the fifth beam during a cell search.

18. The apparatus of claim 10, in which the at least one processor is further configured to skip measuring of the PSS when an amount of interference exceeds a first threshold amount.

19. An apparatus for wireless communication by a user equipment (UE), comprising:
means for determining a first synchronization signal block (SSB) to monitor for beam management, the first SSB comprising a primary synchronization signal (PSS), a plurality of physical broadcast channels (PBCHs), and a secondary synchronization signal (SSS);
means for determining a list of receive beams for measuring the first SSB; and
means for measuring the first SSB comprising:
means for measuring the PSS with a first beam from the list of receive beams;
means for measuring, with a second beam from the list of receive beams, a first demodulation reference signal (DMRS) on a first PBCH symbol of a first PBCH of the plurality of PBCHs;
means for measuring the SSS with a third beam from the list of receive beams; and
means for measuring, with a fourth beam from the list of receive beams, a second DMRS on a second PBCH symbol of a second PBCH of the plurality of PBCHs, in which the first beam, the second beam, the third beam and the fourth beam are each different beams.

20. The apparatus of claim 19, further comprising:
means for measuring a second SSB with additional different beams from the list of receive beams, the second SSB having a same SSB index as the first SSB; and
means for determining a best receive beam from the list of receive beams based on the measuring of the first SSB and the measuring of the second SSB.

21. The apparatus of claim 19, in which the means for measuring the PSS comprises means for determining interference from a neighbor cell is less than a first threshold amount.

22. The apparatus of claim 21, in which the means for determining interference from the neighbor cell is less than the first threshold amount comprises means for determining that the neighbor cell is not detected during a cell search.

23. The apparatus of claim 21, in which the means for determining interference from the neighbor cell is less than the first threshold amount comprises means for determining a measured signal strength of the PSS measured with a fifth beam is within a second threshold amount of a measured signal strength of the SSS measured with the fifth beam.

24. The apparatus of claim 23, in which the measured signal strength of the PSS comprises a first reference signal receive power (RSRP) value and the measured signal strength of the SSS comprises a second RSRP value.

25. The apparatus of claim 23, in which the measured signal strength of the PSS comprises a first signal to interference plus noise ratio (SINR) value and the measured signal strength of the SSS comprises a second SINR value.

26. The apparatus of claim 23, in which the means for determining the measured signal strength of the PSS measured with the fifth beam is within the second threshold amount of the measured signal strength of the SSS measured with the fifth beam operates during a cell search.

27. The apparatus of claim 19, further comprising means for skipping measuring of the PSS when an amount of interference exceeds a first threshold amount.

\* \* \* \* \*